Figure 3:
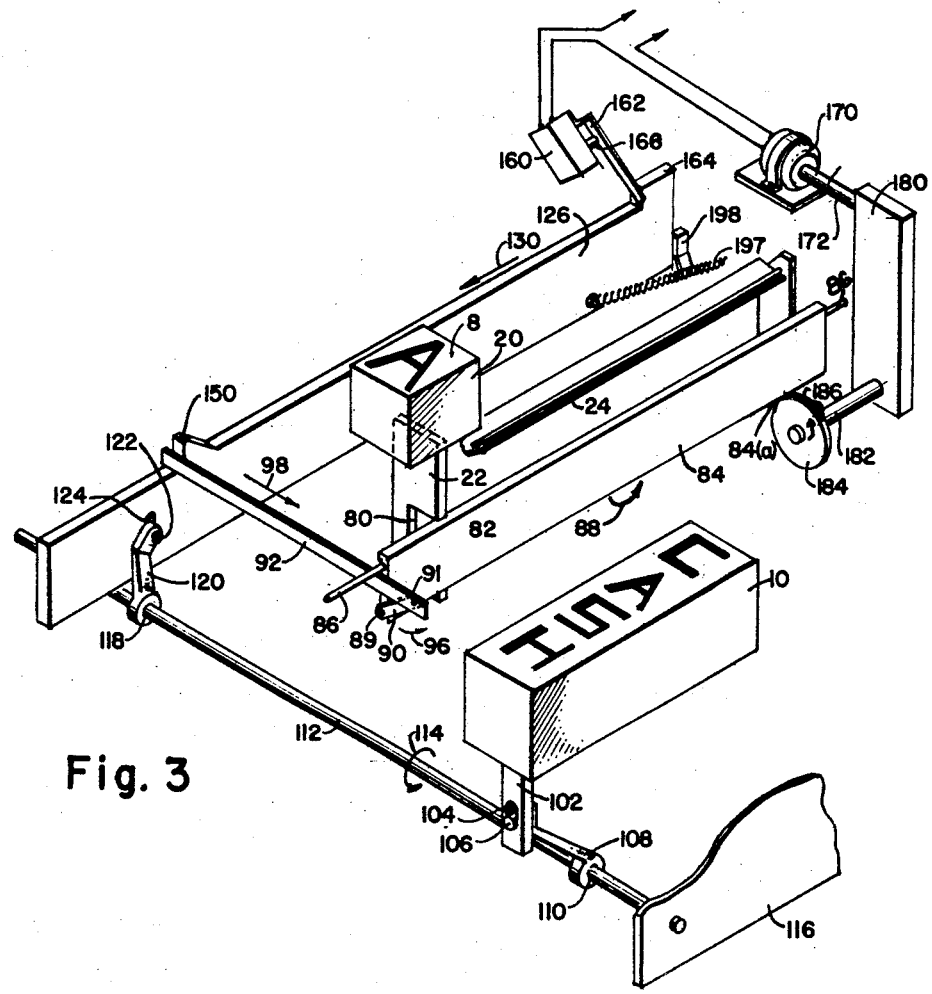

May 7, 1963
L. R. BRIGHAM ET AL
3,088,661
CASH REGISTER-INFORMATION STORAGE ASSEMBLY
Filed June 20, 1960
2 Sheets-Sheet 1
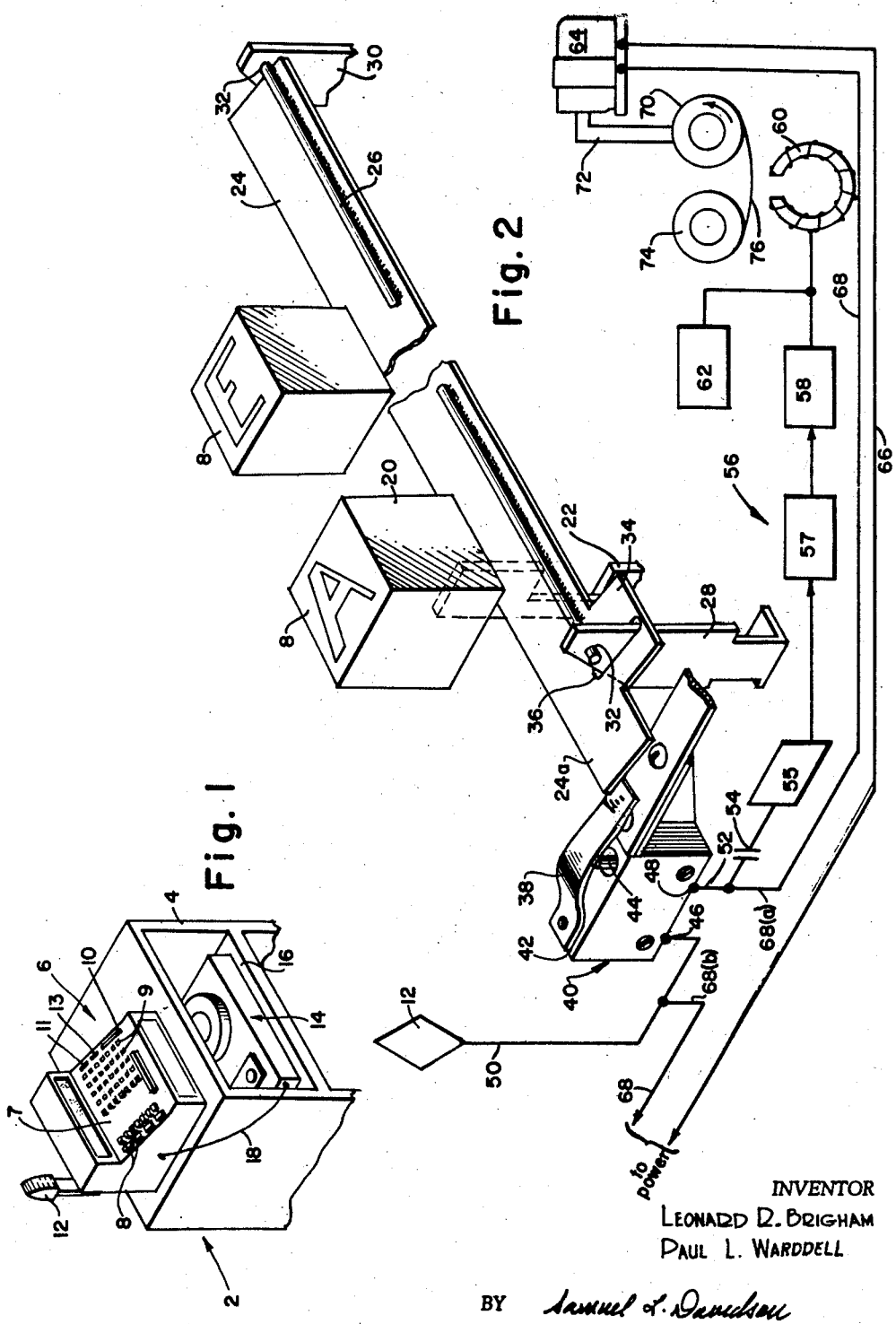
INVENTOR
LEONARD R. BRIGHAM
PAUL L. WARDDELL
BY *Samuel L. Davidson*
ATTORNEY

INVENTOR
LEONARD R. BRIGHAM
PAUL L. WARDDELL

BY *Samuel L. Davidson*

ATTORNEY

3,088,661
CASH REGISTER-INFORMATION STORAGE ASSEMBLY
Leonard R. Brigham, 1737 Ladd St., and Paul L. Wardell, 10813 Jewett St., both of Silver Spring, Md.
Filed June 20, 1960, Ser. No. 37,192
12 Claims. (Cl. 235—2)

This invention relates to cash register systems, and in particular, to a cash register system capable of storing information, originating as sound, for subsequent reproduction.

Cash register systems in common use today incorporate a cash drawer, a calculating mechanism, and an operating member for activating the cash drawer and the calculating mechanism. Many cash registers also include some type of information storage arrangement whereby the total value of sales can be easily determined at the end of the day, or whereby certain information regarding each sale is printed on a paper tape or the like.

Almost all of the cash register-information storage arrangements incorporate a group of selecting keys co-operating with the calculating mechanism, and at least one separate control member connected in the system to cause operation of the calculating mechanism and opening of the cash drawer. Different groups of selecting keys are included in some systems whereby a printed record can be obtained which displays the amount of a particular sale, as well as a letter or letters corresponding to the generic type of goods sold or the department making the sale, for example.

Although the cash register-information storage assemblies heretofore suggested, and in use today, represent substantial improvements over early developments in the art, and although they are designed to store certain information, they do not provide for, or incorporate, an easily-operated means for conveniently recording exactly what was sold each time the cash register was operated.

Accordingly, a primary object of the present invention is to provide a cash register-information storage assembly which can incorporate all of the desirable mechanisms of cash registers in use today, and which in addition includes an easily-operated means for recording the voice of an operator whereby a record can be made by the operator of exactly what items are sold each time the cash register is operated. More specifically, a primary object of the present invention is to provide a cash register-information storage assembly including the usual calculating mechanism, and if desired the usual printed tape arrangement, and also including means for reproduceably recording the voice of an operator of the cash register, so that such operator can merely dictate to the cash register the items specifically sold, and so that the record so made can subsequently be played back to determine what items were sold.

A further object of the present invention is to provide a cash register-information storage system conforming with the preceding objects, and incorporating means for reproduceably recording voice sounds of an operator, (a) which means does not interfere with operation of the calculating mechanism of the assembly, the printed tape mechanism of the assembly, or other desirable mechanisms heretofore available and constituting part of the overall system, and (b) which means can take the form of an attachment to be used with available cash registers.

Yet other, and still further objects of the present invention are: (1) to provide a cash register-information storage assembly in accordance with the preceding object which assembly includes a magnetic recording means automatically activated and de-activated in response to normal operation of the cash register; (2) to provide a cash register-information storage assembly as prescribed above wherein the cash register portion of the assembly can be an only slightly modified electrically-operated standard cash register or an only slightly modified mechanically-operated standard cash register having a "crank-arm" operating member; and (3) to provide a cash register-information storage assembly as set forth in subparagraph (2) above wherein the means for recording or storing reproduceable signals corresponding to voice sounds of an operator is so coupled to the cash register that the duration of time for which the recording means is operative is controllable by operation of the cash register.

A still further, important, and more specific object of the present invention is to provide a cash register-information storage assembly incorporating recording means for storing reproduceable signals corresponding to the voice sounds of an operator, cash register means having a group of selecting keys and at least one operating key, and means coupling the cash register means with the recording means whereby depressing of any one of the selecting keys in the group starts the recording means, and activating the operating member stops the recording means. In this connection, a still further important object of the present invention is to achieve the starting and stopping of the recording means by a single switch operative in response to movement of any one of the selecting keys, and also in response to movement of the operating member.

Still another and further important object of the present invention is to provide a cash register-information storage assembly in accordance with the preceding objects, which assembly incorporates an activatable cash register means having a group of selecting keys and at least one operating member, and wherein means are provided for preventing activation of the cash register by the operating member unless at least one of the selecting keys is first operated.

The invention also has as one of its objects the provision of a cash register-information storage system wherein the voice sounds of an operator to be recorded are picked up by a conveniently-located microphone, and wherein the recording means, although operated by the cash register, can be kept in a location remote from the cash register and microphone.

The system provided by the invention finds particular utility in establishments where inventory control is important. As an operator of the cash register "rings up" a sale, he can dictate the items sold to the system of the invention. At a subsequent time, the record made by the system can be "played back" and a list of items sold can be readily compiled from the record in a short period and at any convenient time. Utilization of the system does not detract from the efficiency of the operator, since he merely recites the items sold while operating a cash register in the usual manner.

In its basic and simplest aspects the cash register-information storage system provided by the present invention includes an activatable cash register having a group of selecting keys movable from a normal position, at least one separate operating member movable to activate the cash register, and means for restoring the selecting keys to normal position automatically after the operating member has been moved to activate the cash register. Transducer means are incorporated for transforming sound into recordable signals, and the transducer means is disposed to pick up the voice sounds of an operator of the register. An activatable recording means for storing reproduceable signals forms part of the system, and means are provided for coupling the transducer means with the recording means whereby reproduceable signals corresponding to the sounds incident upon the transducer means are stored by the recording means when the recording means is activated. Also, the system includes means operative in response to the movement of any key in the group of selecting keys from normal position to activate the recording means and responsive to return of such keys to normal position to de-activate the recording means. Additionally, the invention provides for incorporating in the system means cooperating with the operating member and the group of selecting keys for preventing activation of the cash register by the operating member unless at least one of the group of selecting keys is moved from normal position. Various details of the means included in this brief description and combinations of different components also form part of the invention, as explained in more detail hereinafter.

Figure 4:
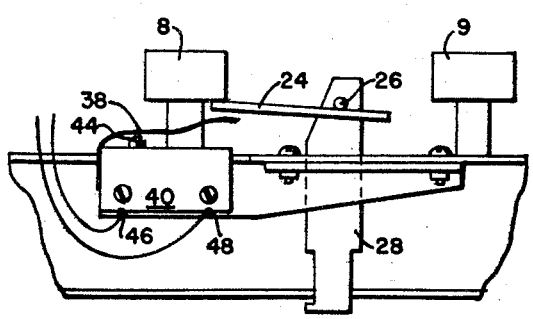

The invention will be better understood, and objects other than those specifically set forth above will become apparent, when consideration is given to the following detailed description of the preferred and illustrative embodiments of the invention presented in the annexed drawings, wherein:

FIGURE 1 is a perspective view of a cash register-information storage assembly constructed in accordance with the present invention and disposed on a shelved store counter;

FIGURE 2 is a fragmental detailed partially schematic and partially elevational view of a portion of the cash register-information storage assembly shown in FIGURE 1, FIGURE 2 presenting the cooperating relationship, provided in accordance with the invention, between selecting keys of a cash register, the preferred means for recording reproduceable sounds, and the means coupling the recording means with the selecting keys;

FIGURE 3 again is an elevational view of a portion of the cash register-information storage assembly shown in FIGURE 1, FIGURE 3 presenting an illustrative arrangement of components coupled together according to the invention so that the selecting keys of the cash register serve to prevent activation of the register by the operating member unless a selecting key is depressed, and also coupled together according to the invention so that the selecting keys are automatically restored to their normal position after the cash register has been activated; and FIGURE 4 is an end view of the portion of the assembly shown in FIGURE 2, FIGURE 4 presenting in more detail the cooperative relationship between a selecting key and the means provided by the invention for activating the recording means.

In FIGURE 1, the cash register-information storage assembly provided by the invention is generally designated by the numeral 2. Such assembly is shown as being carried by a counter 4 which may be located in any accessible part of a store, just as present cash registers are so located.

The assembly 2 includes an activatable cash register generally designated by the numeral 6, and this cash register, as explained in detail hereinbelow, is provided with a group of selecting keys 8 depressable or movable from a normal position, and at least one separate operating member 10 depressable or movable to activate the register. As also explained in detail hereinbelow, means are provided for restoring any one of the selecting keys 8 to its normal position automatically after the operating member 10 has been moved to activate the register.

The assembly further includes a transducer means 12, preferably in the form of a microphone, which serves to transform sound into recordable signals. The transducer means 12 is disposed, as shown, adjacent the cash register 6 whereby it picks up the voice sounds of an operator of the register.

An activatable recording means 14 is provided in the system, and this recording means can be stored on any conveniently-located shelf such as that designated by the numeral 16 directly under the cash register 6. Means in the form of a cable or multi-strand wire 18 couples the transducer or microphone 12 to the recording means 14 whereby reproduceable signals corresponding to sounds incident upon the transducer means are stored by the recording means when the recording means is activated. As shown and explained in connection with FIGURES 2-4 inclusive, the assembly provided by the invention also incorporates means operative in response to movement of any key 8 in the group of selecting keys from normal position to activate the recording means and responsive to return of any key 8 to normal position to de-activate the recording means. Moreover, the assembly includes means cooperating with the operating member 10 and the group of selecting keys 8 for preventing activation of the register 6 by the operating member 10 unless at least one of the group of selecting keys 8 is moved from normal position.

Although in the foregoing general description, and in the following detailed consideration of the preferred assembly and operation, the group of selecting keys has been chosen as the group of keys normally referred to as the "item designation group," it should be understood that rows of numeral keys 9 can be used for operation in the same manner as the row of keys 8, and that an addition bar 11, subtraction bar 13, or the like can be used to activate the register in the same manner as the cash key 10. Moreover, if a mechanical register is used, the crank arm can serve to activate the register.

In addition, it should be understood that the recording means 14 can be disposed in a remote location and need not be placed on a shelf under the register as shown.

As shown in FIGURE 2, the selecting keys 8 include a head member 20 and a depending arm member 22. The head member 20 of each key 8 extends over, and is engageable with a pivotally mounted switch plate 24. The plate 24 is supported by a rod or shaft 26 fixed thereto by any suitable means, such as, for example, by solder. The shaft 26 is supported between brackets 28 and 30 which are fixed to the frame (not shown) of the cash register. Each of the brackets 28 and 30 is provided with an aperture 32 through which the shaft 26 extends whereby the shaft 26 and plate 24 are pivotally mounted with respect to the brackets 28 and 30.

The plate 24 preferably is provided with a projecting flange 34 having a slot 36 extending therethrough, and the bracket 28 fits in upwardly through the slot 36 to support the left end, as shown, of the rod or shaft 26. Any suitable means can be used to pivotally support the plate 24 so that it is engageable by, and operative with movement of the head member 20 of a selecting key 8, and the particular arrangement shown, although preferred, is illustrative of the means which may be used.

The left end 24A of the plate 24, with the arrangement shown, is free to engage a spring arm 38 extending upwardly from a microswitch 40. The spring arm 38 is supported on the microswitch, and spaced from the casing thereof in the usual manner by an insulating member 42. The microswitch can take any suitable form, but as shown, has a projecting operating pin 44 engageable by the spring arm 38 to close the microswitch and establish a closed electrical path between the terminals 46 and 48 of the microswitch 40. Thus, it should be apparent, that with the construction explained above, depressing the setting key 8 results in movement of the bar 24, depression of the spring arm 38, and depression of the operating pin 44 of the microswitch, whereby an electrical circuit is closed through the microswitch.

Coupled to one terminal of the microswitch, namely, terminal 46, is the transducer means or microphone 12. Specifically, a conductor 50 extends from the microphone 12 to the switch terminal 46. Coupled with the switch terminal 46, as by lead 52, is an input capacitor 54 which is coupled with the input of an amplifying means generally designated by the numeral 56. The amplifying means comprises a pre-amplifier 55, an intermediate amplifier 56, and an output or power amplifier 58.

Signals are produced by the transducer means or microphone 12 in the conventional manner. Accordingly, when sounds of an operator of the cash register-information storage assembly are incident upon the transducer means or microphone 12, they are transformed by the microphone into electrical signals which are fed to the terminal 46 of microswitch 40. If the microswitch 40 is closed, then such signals are passed to the terminal 48 of the microswitch, and to and through the input capacitor 54 of the amplifying system 56. The preamplifier 55 serves to build up the input signals, which are then transferred to an intermediate amplifier for further build-up, and which are finally fed to a power amplifier 58 so as to be given a sufficient strength to cause a recording thereof in a manner hereinafter explained.

The output of the power amplifier 58 is coupled with a conventional magnetic recording head 60. For best performance, there is also coupled with the recording head 60 a bias generator 62 which may take the form of any conventional bias generator now used with magnetic recording systems.

Also coupled with the microswitch 40 is a motor drive 64. Specifically, for forward rotation of the motor 64 power is fed from a suitable source (not shown) through the leads 66 and 68. The lead 68 is broken by the microswitch 40, one end thereof, 68A, being coupled to the terminal 48 of the microswitch, and the other end thereof, 68B, being coupled to the other terminal 46 of the microswitch 40. Thus, when the ends of the leads 66 and 68 designated by the arrows are coupled with a suitable source of power, and the microswitch 40 is closed, then the motor 64 is caused to rotate in a forward direction, i.e., a direction whereby the tape reel 70 is driven counter-clockwise. Any conventional mechanical link can extend between the motor 64 and the take-up tape reel 70 whereby the motor serves to drive the reel. Since various drives are well known, the details are not presented in FIGURE 2, and instead the shaft 72 is used to designate generically a suitable drive means.

When the motor 64 is energized, and the tape take-up reel 70 moves counter-clockwise, then tape 76 is pulled from a feed-reel 74 past the magnetic head 60. The tape 76 can be any suitable form of magnetic tape adapted to store, by magnetic disturbances thereon, signals generated within the magnetic recording head 60.

Although the recording system has been described as including a magnetic tape, it should be understood that any suitable magnetic media, such as a magnetic sheet, magnetic record or the like, can be used. Moreover, the recording head means and storage media can take the form of a recording stylus and plastic disc if desired, without departing from the scope and spirit of the invention. The means employed for moving the recording media past the recording head will vary, depending on the type of recording head means and recording media used.

In the arrangement shown in FIGURE 2, the plate member 24, a single member, is engageable by any one of the aligned selecting keys 8 whereby it can be moved counter-clockwise about the axis of shaft 26, upon depression of any one of the selecting keys 8, to close the microswitch 40. Closing of the microswitch 40 couples the transducer means 12 with the magnetic recording head 60, via the amplifying system 56, and also couples the drive motor 64, or means for moving the recording media 76 past the recording head means 60, with a source of power. Preferably, the motor 64 is coupled with a D.C. source of power (not shown) and thus the capacitor 54 serves to block current flowing to the motor 64 from entering the amplifying system. Of course, the signals produced by the transducer means 12 or microphone are A.C. signals, and are readily passed by the input capacitor 54. Thus, a single switch, namely, microswitch 40, serves to couple the microphone with the recording head and to activate the means for moving the recording media past the recording head.

From the foregoing discussion, it should be apparent that FIGURE 2 presents the manner in which a selecting key 8 serves to activate the recording means drive (motor 64) as well as to couple the transducer means (microphone 12) with the recording head 60. Similarly, FIGURE 3 presents the manner in which the selecting key or keys cooperate with, and are linked to the operating member.

In FIGURE 3, the same selecting key 8 is shown as having a head portion 20 and a depending arm portion 22. The head portion is shown as engaging a portion of the switch plate 24. The depending arm portion is provided with a recess or channel 80 having a horizontally extending and projecting top wall 82 engageable with the upper side of a pivotal plate 84. The plate 84 may be supported in any conventional manner whereby it is rotatable about its shaft projections 86 when the selecting key 8 is depressed so that the wall 82 engages the top edge of the plate 84. As the selecting key 8 moves down, the plate 84 is caused to pivot counter-clockwise, or in the direction of arrow 88.

Carried at the forward end of the plate 84 and pivoted thereto, as at 89, is a link 90 which extends transverse to the vertical axis of the plate 84, and which is fixedly coupled with a reciprocating bar 92, as at 91. The bar 92 is supported by the link 90, as well as by any other suitable means on the register frame (not shown) spaced from link 90. When the plate 84 is rotated about the axis of the shaft projections 86 as the key 8 is depressed, the link 90 moves in the direction of the arrow 96 causing the bar 92 to move to the right, as shown, in the direction of arrow 98. Thus, depression of a selecting key 8 causes movement of the bar 92 to the right, as shown. The bar 92, as hereinafter described, is a lock bar which serves as a means to prevent activation of the register by the operating member or "cash" key 10 unless a selecting key 8 is first depressed.

Now, as suggested above, in addition to the selecting keys 8, the cash register 6 is also provided with an operating member, which as shown, takes the form of "cash" key 10. Such key 10 is, in a conventional manner, mounted for vertical reciprocation with respect to the face 7 (FIGURE 1) of the cash register 6. According to the invention, the operating member or "cash" key 10 has a depending arm 102 provided with a slot 104. Extending through the slot 104 is a pin 106 which projects forwardly from a cam bracket 108 fixed to a collar 110 secured on a shaft 112 extending across, but under, the front of the face 7 of the cash register. Upon depressing the operating member or key 10, the pin 106 is engaged by the top of the slot 104, and the shaft 112 is caused to rotate several degrees counter-clockwise or in the direction of arrow 114. The shaft 112 is, preferably, rotatably supported between end members of the cash register frame, such as that designated by numeral 116. Moreover, the cash key or operating member 10 is preferably disposed on the right hand side of the cash register, and thus cooperates with the right hand end of the shaft 112.

Carried near the left hand end of the shaft 112 and fixed thereto is a collar 118 from which projects a cam arm 120. The cam arm 120 carries at the end thereof remote from the shaft 112, a pin 122 which extends through a slot 124 provided in a reciprocal switch activating plate 126.

With the arrangement shown, as the operating member or cash key 10 is depressed, the shaft 112 is caused to move counter-clockwise by virtue of the cooperation between depending arm 102 of operating member 10 and the cam and slot arrangement (104—106) cooperating therewith. This causes a counter-clockwise rotation of the pin 122 and as a result the switch operating plate 126 is urged forwardly in the direction of arrow 130. If reciprocating bar 92 operated by the selecting keys 8, as explained above, is engaging the stop projection 150 extending from the top of switch plate 126, then the switch plate 126 cannot move forward in the direction of the arrow 130, and the operating member 10 is prevented from activating the register through switch 160.

The switch 160 comprises a microswitch disposed with its switch arm 162 in the path of the switch projection 164 carried at the rear of reciprocating switch plate 126. If the switch plate 126 cannot move in the direction of arrow 130, then the switch projection 164 cannot engage the switch arm 162 to move the same into contact with the projecting operating pin 166 of the switch 160. Thus, when the reciprocally-mounted lock bar 92 engages the stop projection 150 of the switch bar 126, microswitch 160 cannot be closed.

However, when a selecting key 8 is depressed, and reciprocal plate 84 is rotated in the direction of arrow 88, then lock bar 92 moves in the direction of arrow 98 out of engagement with the stop projection 150 carried by switch plate 126. Thus, in order to operate the assembly, it is necessary to first depress the selecting key 8, so as to move lock bar 92 out of blocking relation with respect to the projection 150 on switch plate 126. After a selecting key 8 has been depressed, then the operating member or cash key 10 can be depressed to cause the switch plate 126 to move in the direction of arrow 130, whereby the switch stop 164 carried by the switch plate 126 engages the switch arm 162, and moves forward causing depression of the operating pin 166 of the microswitch 160.

When the cash key is depressed, and the system is first primed by depressing a selecting key 8, then the microswitch 160 is closed in the manner heretofore explained. Closing of the microswitch couples the motor 170 mechanically, as via a shaft 172, with a cyclic clutch 180. Extending from the clutch is a shaft 182 which carries a cam plate 184 having a cam 186 on the face thereof. When motor 170 is coupled with a source of power by microswitch 160, then the motor 170 and clutch 180 begin their cyclic operation in the usual manner. Upon completion of the cycle, the cam 186 engages the bottom edge of the reciprocally-mounted plate 84, whereby the plate 84 is rotated clockwise back to its initial position. The cam 186 moves under the plate 84 when the plate 84 reaches vertical position, however, when plate 84 has been pivoted by a selecting key 8, then the edge 84(a) thereof is in the path of the cam 186.

A spring 197 is provided to restore the switch plate 126 to its original position against stop 198 prior to return of plate 84 to its original position, and accordingly prior to return of lock bar 92 to its original position. Of course, return of reciprocal plate 84 to vertical position restores key 8 to its original position, and thus the selecting keys are automatically restored to their normal position after the register has been activated by movement of operating member 10.

When a selecting key which has been moved during an operation of the register, returns to its normal position, then the pivotal bar 24 also returns to its original position being pushed up by spring arm 38 (FIGURES 2 and 4) of microswitch 40. Thus, switch 40 is opened and the microphone 12 is disconnected from the amplifying means 56 and recording head means 60, and simultaneously therewith the means (motor 64) for moving the recording media (tape 76) past the recording head means is disconnected from its source of power. Accordingly, it should be apparent that the selecting keys 8, upon depression, as shown, start operation of the drive of the recording means and connect the microphone 12 to the amplifying means 56, and that the recording means drive is cut off simultaneously with disconnecting of the microphone from the amplifying means upon return of the selecting keys to their normal position.

The operating member or cash key 10 returns to its initial position upon return of the switch plate 126 to its original position. Of course, springs or other suitable means can be incorporated, as in a usual cash register assembly, to coact with the operating member 10 and cause the return thereof to initial position.

If desired, a tone generator or bell may be incorporated in the system to produce a recordable signal each time the cash register is operated. Such signal would clearly separate different transactions, however, the system provided by the invention has been found to function completely satisfactorily without such additional signal means.

Although a means for automatically restoring the selecting keys to normal position has been specifically described above, it should be understood that any suitable means can be used just as well. The arrangement described is presented solely for the purpose of simplicity, and it will be apparent to those of ordinary skill in the art that the usual linkage arrangements used in present cash registers, including cams, shafts, springs, and plates which produce the same results as herein described, but which in addition cooperate with the complex calculating mechanisms, can be utilized for the purposes taught. The particular linkage and returning means thus form no part of the present invention, and any suitable means now existent can be used. Moreover, as will also be apparent to those of ordinary skill in the art, any suitable supports can be used for mounting the various components. For an example of particular mountings and linkages reference should be made to the catalog of the Clary Cash Register Corporation, revised March 1958, and presenting detailed arrangements used in Clary Models 302–13000, 302–21000, 23100. Also reference should be made to Clary Cash Register Model 302.

The lock bar 92 and linkages cooperating therewith which form means cooperating with the operating member and group of selecting keys for preventing activation of the register by the operating member unless one of the selecting keys is depressed can also be any suitable arrangement now existing. An arrangement such as that shown wherein the lock bar is operated through a pivotal plate engaged by a selecting key, however, is preferred.

The motor 170 and clutch 180 preferably are the same motor and clutch as used to operate the calculating, printing, and drawer mechanisms (not shown) and thus, the invention can be considered an attachment for use with a standard cash register, such attachment including means cooperating with and activated by the cash register in normal operation as described hereinabove.

After reading the foregoing description, it should be apparent that the objects set forth at the outset of this specification have been successfully achieved. It should also be apparent that various modifications can be made to the illustrative embodiment presented without departing from the scope and spirit of the invention.

What is claimed is:

1. A cash register-information storage assembly comprising the combination of an activatable cash register having at least one cash drawer, a group of selecting keys movable from a normal position, and at least one separate operating member movable to activate said register and open said drawer, transducer means for transforming sound into recordable signals and disposed to pick up the voice sounds of an operator of said register; an activatable recording means for storing reproduceable signals; means coupling said transducer means to said recording means; and means operative in response to movement of at least one key in said group from normal position to activate said recording means and responsive to movement of said operating member to de-activate said recording means.

2. A cash register-information storage assembly comprising the combination of an activatable cash register having at least one cash drawer, a group of selecting keys movable from a normal position, at least one separate operating member movable to activate said register and open said drawer, and means for restoring said selecting keys to normal position automatically after said operating member has been moved to activate said register; transducer means for transforming sound into recordable signals and disposed to pick up the voice sounds of an operator of said register; an activatable recording means for storing reproduceable signals; means coupling said transducer means to said recording means whereby reproduceable signals corresponding to sounds incident upon said transducer means are stored by said recording means when said recording means is activated, means operative in response to movement of any key in said group of selecting keys from normal position to activate said recording means and responsive to return said key to normal position to deactivate said recording means, and means cooperating with said operating member and said group of selecting keys for preventing activation of said register by said operating member unless at least one of said group of selecting keys is moved from normal position.

3. A cash register-information storage assembly comprising the combination defined in claim 2, wherein said recording means is electrically activatable, and wherein said means operative in response to movement of any key in said group of selecting keys comprises an electrical switching means including and operated by a single member movable with any one of the keys in said group of selecting keys.

4. A cash register-information storage assembly comprising the combination defined in claim 3 wherein said selecting keys include head members and depending arm members, wherein said depending arm members are engageable with at least a part of said means cooperating with said operating member and said group of selecting keys for preventing activation of said register by said operating member unless at least one of said group of selecting keys is moved from normal position; wherein said single member included in said switching means comprises a movably mounted plate; and wherein said head members are engageable with said plate to move said plate with movement of said head members.

5. In combination with an activatable cash register having at least one cash drawer, a group of selecting keys movable from a normal position, at least one separate operating member movable to activate said register and open said drawer, and means for restoring said selecting keys to normal position automatically after said operating member has been moved to activate said register; transducer means for transforming sound into electrical signals and disposed to pick up the voice sounds of an operator of said register, an activatable recording means for storing electrically reproduceable signals on a magnetic media, means coupling said transducer means to said recording means whereby magnetic signals corresponding to sounds incident upon said transducer means are stored on said magnetic media of said recording means when said recording means is activated; means operative in response to movement of said group of selecting keys from normal position to activate said recording means and responsive to return of said selecting keys to normal position to de-activate said recording means; and means coupled between said operating member and said group of selecting keys for preventing activation of said register by said operating member unless at least one of said group of selecting keys is moved from normal position.

6. The combination defined in claim 5 wherein said activatable recording means includes an amplifying means having input and output terminals, magnetic recording head means coupled with the output terminal of said amplifying means to receive amplified signals therefrom, a movable magnetic medium on which reproduceable signals are recordable by said recording head means, and electrically operated means for moving said magnetic medium past said recording head means; wherein said means operative in response to movement of said group of selecting keys from and to normal position comprises a switching means having a pair of switch terminals, one of said switch terminals being electrically coupled to said electrically operated means for moving said magnetic medium past said recording head, and the other of said terminals being electrically coupled to a source of power for said electrically operated means; and wherein one of said switch terminals is also electrically coupled to the input terminal of said amplifying means and the other of said switch terminal is also electrically coupled to said transducer means whereby said switching means in response to movement of said selecting keys couples said transducer means to said amplifying means so that electrical signals produced by said transducing means are amplified, and fed to said magnetic recording head means and said switching means simultaneously couples said means for moving said magnetic medium past said recording head means with a source of power so that said magnetic medium is moved past said recording head means.

7. A cash register-information storage assembly comprising the combination of an activatable cash register having a group of selecting keys movable from a normal position and aligned with respect to a given axis, at least one separate operating member movable to activate said register, and means for restoring said selecting keys to normal position automatically after said operating member has been moved to activate said register; microphone means for transforming sound into electrical signals and disposed to pick up the voice of an operator of said register, an activatable recording means for storing electrically reproduceable signals, means coupling said microphone means to said recording means whereby signals corresponding to sounds incident upon said microphone means are stored by said recording means when said recording means is activated, a pivotally mounted elongated member disposed with the longitudinal axis thereof parallel to said given axis, said elongated member being engageable by said selecting keys for pivoting in response to movement of said selecting keys from normal position; switching means responsive to pivoting of said elongated member to activate and de-activate said recording means, and means coupled between said operating member and said group of selecting keys for preventing activation of said register by said operating member unless at least one of said group of selecting keys is moved from normal position.

8. A cash register-information storage assembly comprising the combination defined in claim 7 wherein said switching means comprises a single microswitch having a movable arm engageable by said elongated member, and adapted to close said microswitch to activate said recording means.

9. A cash register-information storage assembly comprising the combination defined in claim 8 wherein said recording means includes a recording medium, a recording head means for putting signals on said medium, and energizable means for moving said recording medium with respect to said recording head means whereby successive signals are put on said medium at spaced positions; and wherein said microswitch is coupled between said microphone means and said recording head means, and between said means for moving said recording medium and a source of power therefor whereby moving any one of said selecting keys and pivoting said elongated member, and thereby operating said microswitch, signals are transferable from said microphone means to said recording head means and thereby said recording medium, and simultaneously said means for moving said recording medium is energized, to move said medium with respect to said recording head means.

10. A cash register-information storage assembly comprising the combination of an activatable cash register having at least one cash drawer, a group of selecting keys movable from a normal position, at least one separate operating member movable to activate said register and open said drawer, and means for restoring said selecting keys to normal position automatically after said operating member has been move to activate said register; transducer means for transforming sound into recordable signals and disposed to pick up the voice sounds of an operator of said register, an activatable information storage means for storing reproduceable signals, said information storage means including a recording medium, recording means responsive to electrical signals for putting corresponding reproduceable signals on said medium, and activatable means for moving said medium, switching means operative in response to movement of said group of selecting keys from normal position to activate said means for moving said medium and simultaneously couple said transducer means to said recording means, said switching means also being operative in response to return of said selecting keys to normal position to de-activate said means for moving said medium and to uncouple said transducer means from said recording means, and means coupled between said operating member and said group of selecting keys for preventing activation of said register by said operating member unless at least one of said group of selecting keys is moved from normal position.

11. A cash register-information storage assembly comprising the combination defined in claim 10 wherein said recording means includes amplifying means having input and output terminals, and a recording head connected to said output terminals, wherein said means for moving said medium includes a motor, and wherein said switching means comprises a single microswitch coupled between said transducer means and said input terminals of said amplifying means and said motor and a source of power therefor.

12. A cash register-information storage assembly comprising the combination of an activatable cash register having at least one cash drawer, a group of selecting keys movable from a normal position, and at least one separate operating member movable to activate said register and open said drawer; transducer means for transforming sound into recordable signals and disposed to pick up the voice sounds of an operator of said register; an activatable recording means for storing reproduceable signals; means coupling said transducer means to said recording means; conductor means for connecting said recording means with a source of power; electrical switching means connected in said conductor means and selectively operable between open and closed positions for respectively opening and closing a current path through said conductor means; and, means operative in response to movement of at least one key in said group from normal position to close said switching means and responsive to movement of said operating member to open said switching means.

References Cited in the file of this patent

UNITED STATES PATENTS

| | | |
|---|---|---|
| 786,304 | Mniszewski | Apr. 4, 1905 |
| 827,779 | Baynes | Aug. 7, 1906 |
| 2,741,426 | Golemon | Apr. 10, 1956 |
| 2,858,066 | Oyala | Oct. 28, 1958 |